United States Patent
Lund et al.

(10) Patent No.: US 9,740,082 B1
(45) Date of Patent: Aug. 22, 2017

(54) ENHANCED ORGANIC ELECTRO-OPTIC POLING THROUGH NANOPARTICLE DOPING

(71) Applicant: The Board of Regents, The University of Texas System, Austin, TX (US)

(72) Inventors: Benjamin R. Lund, Wylie, TX (US); Samsuddin Faisal Mahmood, Dallas, TX (US); Naixin Yang, Richardson, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 22 days.

(21) Appl. No.: 15/044,109

(22) Filed: Feb. 16, 2016

(51) Int. Cl.
| | |
|---|---|
| *G02F 1/035* | (2006.01) |
| *G02F 1/355* | (2006.01) |
| *G02F 1/361* | (2006.01) |
| *G02F 1/225* | (2006.01) |
| *G02F 1/21* | (2006.01) |
| *B82Y 20/00* | (2011.01) |
| *B82Y 35/00* | (2011.01) |

(52) U.S. Cl.
CPC ............ *G02F 1/3558* (2013.01); *G02F 1/225* (2013.01); *G02F 1/3615* (2013.01); *B82Y 20/00* (2013.01); *B82Y 35/00* (2013.01); *G02F 2001/212* (2013.01); *Y10S 977/735* (2013.01); *Y10S 977/788* (2013.01); *Y10S 977/842* (2013.01); *Y10S 977/932* (2013.01)

(58) Field of Classification Search
CPC ............ Y10S 977/735; Y10S 977/788; Y10S 977/842; Y10S 977/932; B82Y 20/00; B82Y 35/00; G02F 1/3558; G02F 1/225; G02F 1/3615; G02F 2001/212
USPC .......................................................... 385/33
See application file for complete search history.

(56) References Cited

U.S. PATENT DOCUMENTS

| | | | | |
|---|---|---|---|---|
| 6,819,845 | B2 * | 11/2004 | Lee ........................ | B82Y 10/00 257/E21.09 |
| 7,772,013 | B2 * | 8/2010 | Robinson ............... | B82Y 20/00 436/524 |
| 8,554,022 | B1 * | 10/2013 | Hochberg ......... | H01L 29/66977 257/21 |
| 8,587,861 | B1 * | 11/2013 | Zhou ........................ | C09J 4/00 257/40 |
| 9,507,182 | B2 * | 11/2016 | Williams ................ | G02F 1/035 |
| 2006/0214140 | A1 * | 9/2006 | Nishikata .............. | G02F 1/3615 252/582 |

(Continued)

OTHER PUBLICATIONS

Probing the linear and nonlinear optical properties of nitrogen-substituted carbon nanotube by Sun et al.; J Mol Model (2012) Published online: Jan. 14, 2012.*

(Continued)

*Primary Examiner* — Thomas A Hollweg
*Assistant Examiner* — Guy Anderson
(74) *Attorney, Agent, or Firm* — Yee & Associates, P.C.

(57) ABSTRACT

A method of poling an organic polymeric electro-optic material. The method includes doping the organic polymeric electro-optic material with nanoparticles. The method also includes heating the organic polymeric electro-optic material to a poling temperature. The method also includes poling the organic polymeric electro-optic material by applying an electric field across the organic polymeric electro-optic material.

11 Claims, 9 Drawing Sheets

(56) References Cited

U.S. PATENT DOCUMENTS

| | | | | |
|---|---|---|---|---|
| 2007/0248760 | A1* | 10/2007 | Chmelka | B82Y 30/00 |
| | | | | 427/402 |
| 2008/0044148 | A1* | 2/2008 | Robinson | B82Y 20/00 |
| | | | | 385/122 |
| 2013/0034323 | A1* | 2/2013 | Costache | G02F 1/313 |
| | | | | 385/8 |
| 2013/0243693 | A1* | 9/2013 | Omenetto | A61Q 17/04 |
| | | | | 424/9.1 |
| 2014/0145365 | A1* | 5/2014 | Omenetto | H01L 21/02 |
| | | | | 264/104 |
| 2015/0292981 | A1* | 10/2015 | Norwood | G02B 21/0016 |
| | | | | 356/73.1 |
| 2015/0346521 | A1* | 12/2015 | Williams | G02F 1/065 |
| | | | | 385/2 |

OTHER PUBLICATIONS

Graphene Photonics, Plasmonics, and Broadband Optoelectronic Devices by Bao et al.; ACS Nano vol. 6 No. 5 3677-3694 2012 www.acsnano.org.*

Organic-inorganic hybrid materials for non-linear optics byInnocenzi et al.; Journal of Materials Chemistry First published as an Advance Article on the web Aug. 15, 2005.*

Winiarz et al., "Observation of the Photorefractive Effect in Hybrid Organic—Inorganic Nanocomposite," J. Am. Chem. Soc., Published on Web May 18, 1999, 121, pp. 5287-5295.

* cited by examiner

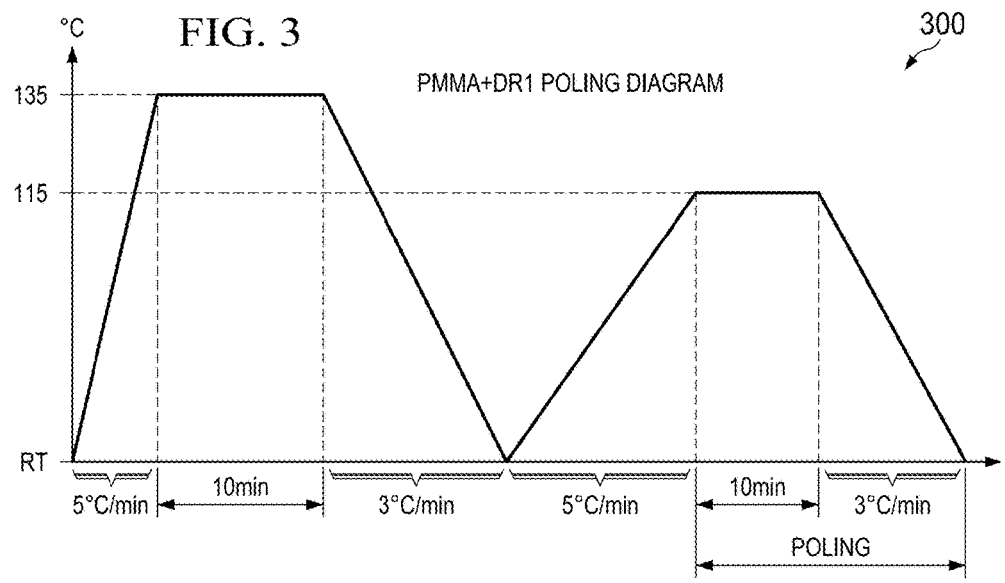
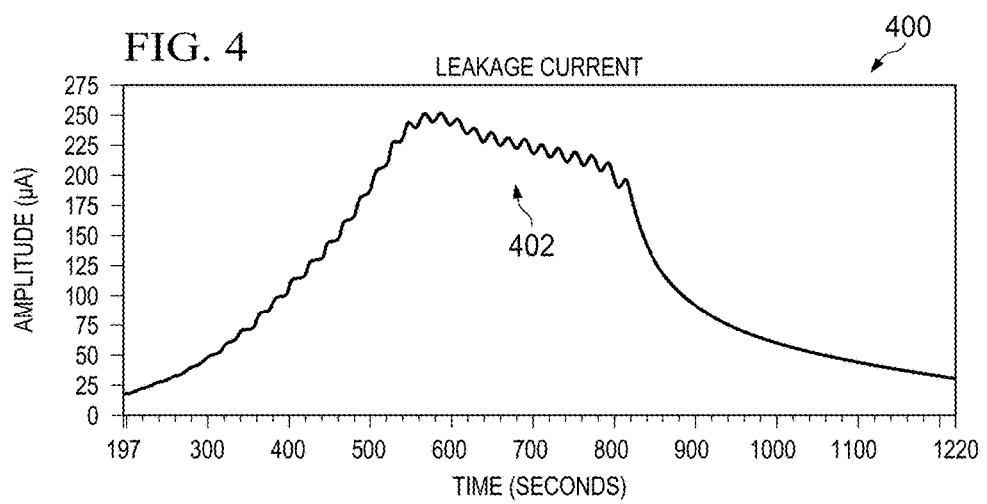

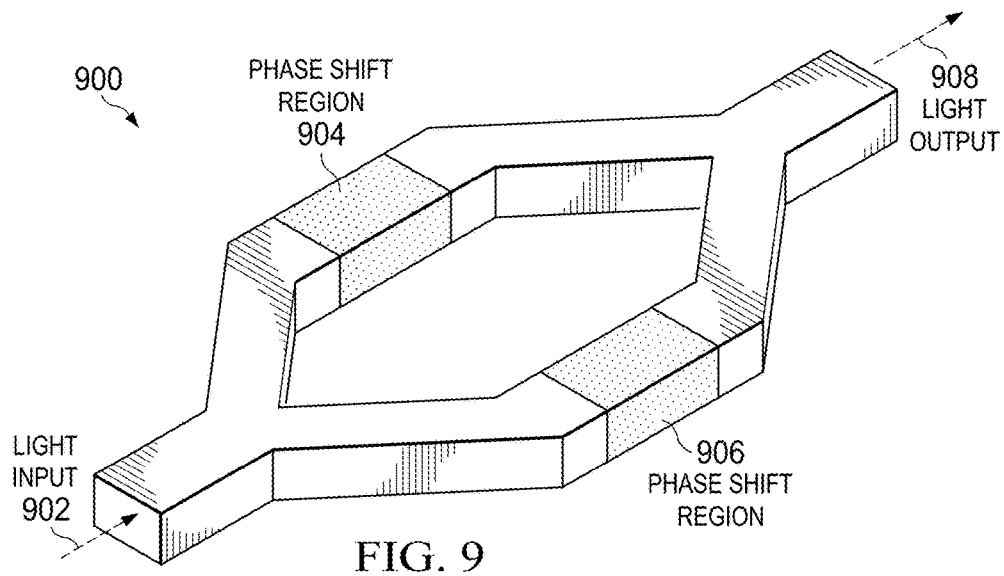
FIG. 9
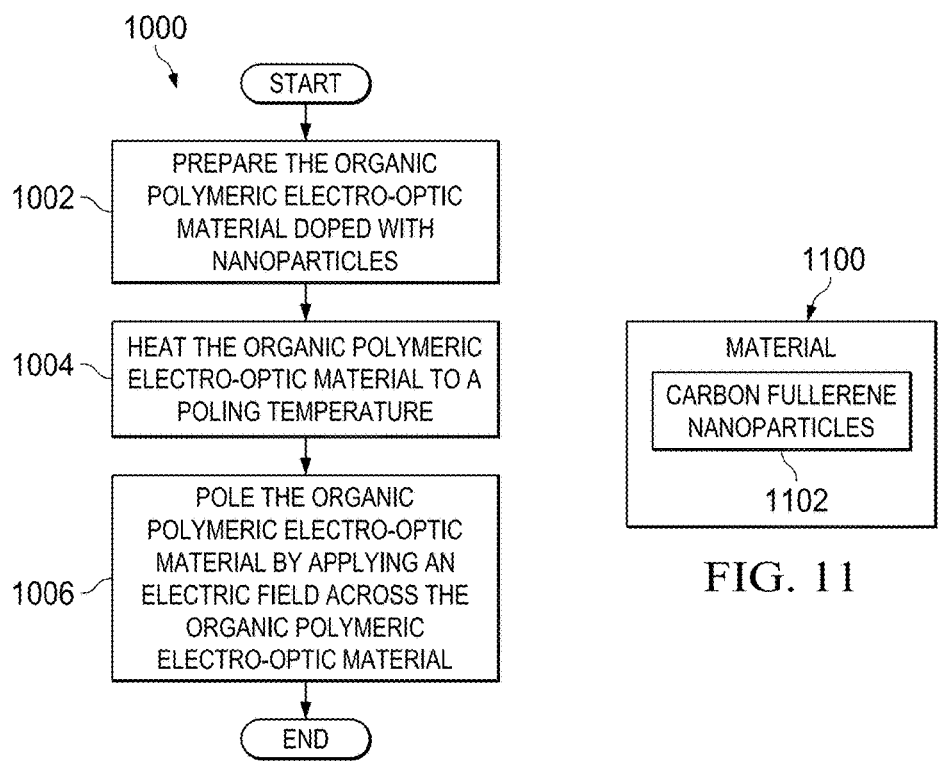
FIG. 10
FIG. 11

ENHANCED ORGANIC ELECTRO-OPTIC POLING THROUGH NANOPARTICLE DOPING

BACKGROUND INFORMATION

1. Field

The present disclosure relates to methods and devices for improving the electro-optic coefficient (r33) in organic polymeric electro-optic materials.

2. Background

Electro-optic EC materials have attracted interest due to their potential applications in optical data transmission and optical information processing. For example, an EC device, such as a phase modulation waveguide, affects a change in the phase of light propagating through it. This change in phase may be accomplished through the application of an applied potential across the electro-optic material, causing a change in the refractive index of the material. The change in refractive index in turn leads to a change in the phase of the propagating light.

The degree of change in refractive index is due, in part, to the electro-optic coefficient of a material. The electro-optic coefficient is referred to as "r33". The r33 coefficient is defined as the change in refractive index through an electro-optic material per applied volt (pm/V). For some optical applications, the higher the r33 coefficient of the material constituting an optical device, the better the performance of that optical device. Thus, techniques for improving the r33 value of a material are considered desirable.

SUMMARY

The illustrative embodiments provide for a method for poling an organic polymeric electro-optic material. The method includes doping the organic polymeric electro-optic material with nanoparticles. The method also includes heating the organic polymeric electro-optic material to a poling temperature. The method also includes poling the organic polymeric electro-optic material by applying an electric field across the organic polymeric electro-optic material.

The illustrative embodiments also provide for a material having improved electro-optic coefficient (r33) values. The material includes an organic polymeric electro-optic material doped with carbon fullerene (C60) nanoparticles.

The illustrative embodiments also provide for an optical device. The device includes an optical modulator composed of an organic polymeric electro-optic material doped with carbon fullerene (C60) nanoparticles, the organic polymeric electro-optic material with C60 nanoparticles having been poled.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 3 is a graph showing a poling profile for a PMMA/DR1 system, in accordance with an illustrative embodiment;

FIG. 4 is a graph showing a leakage current profile, in accordance with an illustrative embodiment;

FIG. 9 illustrates a Mach-Zehnder interferometer using C60 doped electro-optic materials, in accordance with an illustrative embodiment;

FIG. 10 is a flowchart of a method of poling an organic polymeric electro-optic material, in accordance with an illustrative embodiment; and FIG. 11 is a block diagram of a material having improved electro-optic coefficient (r33) values, in accordance with an illustrative embodiment.

DETAILED DESCRIPTION

Figure 1:
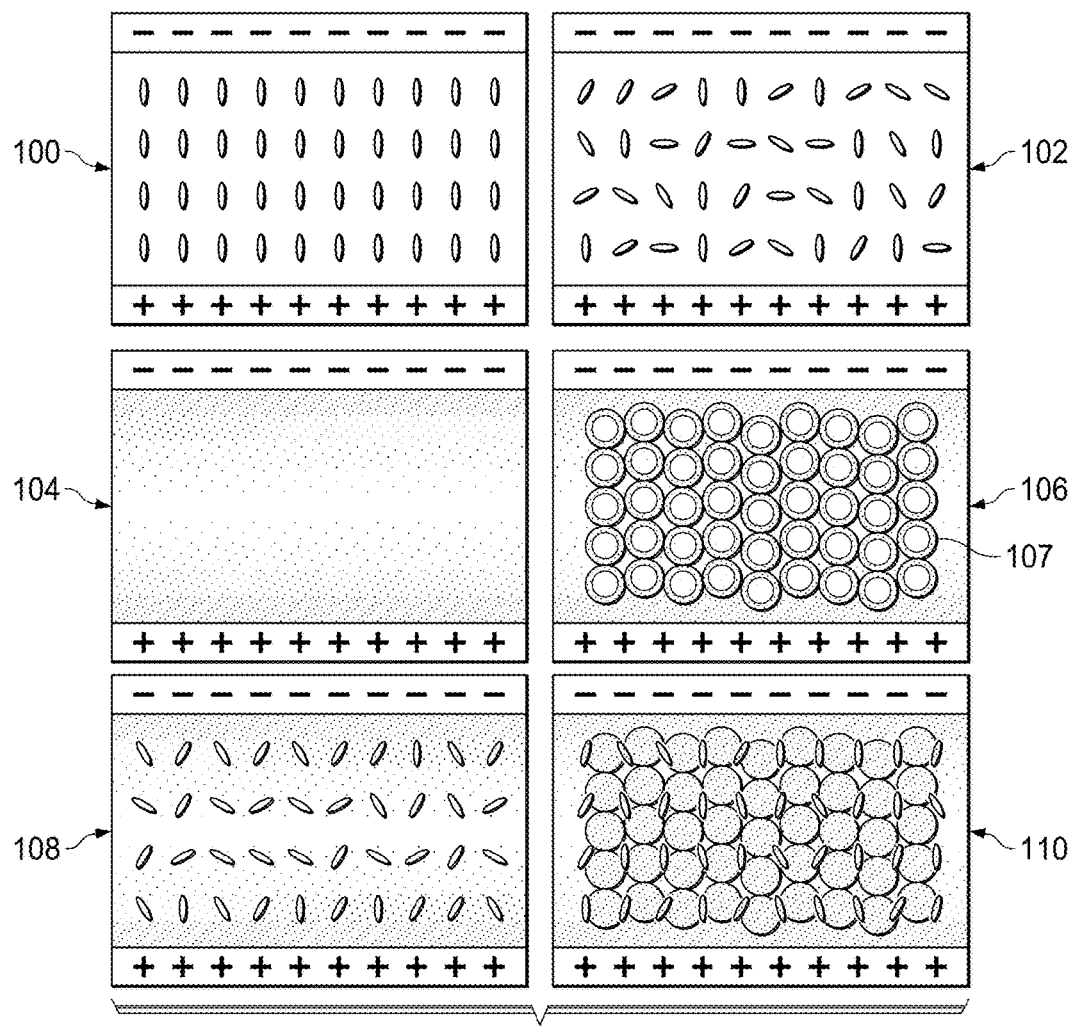
FIG. 1 illustrates orientation of chromophores within an optical material and the effect of electrical poling on chromophore orientation, in accordance with an illustrative embodiment.

The illustrative embodiments recognize and take into account that materials having improved electro-optic coefficients are desirable. The illustrative embodiments also recognize and take into account that the inventive techniques described herein have resulted in materials having an improved electro-optic coefficient (r33) relative to other optical materials. Specifically, the illustrative embodiments relate to doping certain organic electro-optic materials with nanoparticles to improve the r33 value of the organic electro-optic materials. In a more specific example, the illustrative embodiments relate to doping PMMA/DR1, also known as poly(methyl methacrylate)/(N-Ethyl-N-(2-hydroxyethyl)-4-(4-nitrophenylazo)aniline), with carbon fullerene (C60) nanoparticles. As used herein, the term "C60" refers to carbon fullerene nanoparticles.

In a still more specific example, the electro-optic coefficient of organic non-linear optical guest-host systems composed of poly(methyl methacrylate)/Dispersed Red 1 (PMMA/DR1) were measured and compared with a nanomaterial doped PMMA/DR1 system. It was found that a doping of 0.20 wt. C60 enhanced EO coefficient (r33) values by eighty percent compared to the non-doped system. This experiment is the first report of the enhancement of an electro-optic coefficient by C60 doping in a guest host polymer-chromophore blend system. This technology could be used to design and make new electro-optic devices where rapid optical modulation is desirable.

Organic polymers containing push-pull chromophores are useful for the realization of high-speed electro-optic devices with broad bandwidths (200 GHz) which can be operated at low voltages (<1 V). Some design motifs in such chromophores are electron donor (push)-acceptor (pull) functionalities connected via a n-conjugated bridge. The organic chromophores of the illustrative embodiments exhibit high thermal and chemical stability, high nonlinearity, and transparency.

As stated above, the electro-optic constant r33 is defined as the change in refractive index through an electro-optic material per applied volt (pm/V). The r33 constant is related to the µβ constant in electro-optic materials. The µβ constant is the cross product of molecular dipole moment (µ) and molecular hyper polarizability (β), typically expressed in electrostatic units of charge (ESU). The term µβ is proportional to the electro-optic coefficient (r33) of an electro-optic material, assuming isotropic dispersion of guest chromophore moieties in a host polymer matrix.

In order to orient the polymer molecular structure, poling is performed by applying a strong electric field at elevated temperature. However, dielectric breakdown during poling occurs more readily as temperature increases, which in turn may significantly decrease yield during processing.

Current methodologies for incorporating electro-optic materials into active devices often utilize a passive cladding which shields the electro-optic core from an applied poling field. This shielding may decrease the poling efficiency up to 30 percent. While doping with ions may lower the resistivity of the cladding, this doping also leads to enhanced breakdown. Thus, the development of more efficient poling procedures would be useful to the commercialization of current electro-optic materials, as well as to enable control of the crosslinking, and thus resultant lifetime, of these systems during poling. To this end the illustrative embodiments provide for the study of the electrets phenomena to introduce localized space charges into the electro-optic system through the incorporation of carbon fullerene (C60) nanoparticles to enable more efficient and effective poling.

The illustrative embodiments have many applications. For example, the illustrative embodiments may be used for an optical switch. In another example, the illustrative embodiments may be used for an optical modulator, which may have a range of states. In a still more specific example, the illustrative embodiments may be used in a Mach-Zehnder interferometer.

In any case, the modulating voltage of an electro-optic device, like an optical switch or a Mach-Zehnder interferometer, is proportional to the r33 of an electro-optic active area under bias and as well as to the length of the active area under bias. For example, a device containing an electro-optic material with an r33 of 30 pm/V will require twice as much driving potential, or twice as long of an active area under bias, as a material with an r33 of 60 pm/V. Both of these parameters, driving potential and device geometry, are useful design parameters for the microelectronic industry where voltage and space budgets are desirably conserved.

In summary, the illustrative embodiments enhance the electro-optic performance of organic polymeric electro-optic materials by doping with nanoparticles, particularly but not limited to C60 nanoparticles. Electro-optic coefficient (r33) measurements of organic polymeric electro-optic materials containing nanoparticles have displayed enhancements of up to eighty percent compared to identical materials not containing nanoparticles.

The electro-optic materials described herein include active molecular moieties, or chromophores, either blended into a host polymer, enchained to a polymer backbone, or crosslinked into a polymeric network. Enhancing nanoparticles may be organic, inorganic, or organic-inorganic in composition and possess dimensions from 0.5 nm to 100 nm in diameter. Improvements of electro-optic performance, determined by r33 measurements, of up to eighty percent has been observed for an electro-optic material including poly(methylmethacrylate) (PMMA), Disperse Red-1 (DR1) chromophore, and 0.2 percent weight C60. The chemical formula of DR1 is N-Ethyl-N-(2-hydroxyethyl)-4-(4-nitrophenylazo) aniline.

Again, the illustrative embodiments enhance the performance of electro-optic materials by enhancing the poling efficiency of the electro-optic material. Thin-film, polymeric electro-optic materials display a non-linear electro-optic response due to the presence of chromophore moieties dispersed within a polymer matrix. These active moieties are initially distributed in a host matrix randomly requiring poling (application of an electric field at high temperature) to make them active (bring them into alignment). Ineffective poling of a chromophore-polymer composite will result in low electro-optic activity (low r33), even if the chromophores possess a high µβ. Therefore, efficient poling is useful for the formation of efficient electro-optic devices. Techniques or materials which enhance poling will increase the r33 of an electro-optic material, increasing its value by enabling electro-optic modulating devices to be smaller and require lower voltages for function.

FIG. 1 illustrates orientation of chromophores within an optical material and the effect of electrical poling on chromophore orientation, in accordance with an illustrative embodiment. In particular, FIG. 1 demonstrates the potential enhancement of poling of an electro-optic material through the use of nanoparticles. In FIG. 1, each box represents an electro-optic material. Note that FIG. 1 may represent an idealized, hypothetical system and may not reflect the actual state of the system. For example, the orientation of the chromophores may vary from what is shown in FIG. 1. Further, the density of the dispersed C60 particles may be significantly higher in the drawing relative to a real sample.

In box 100, an electro-optic material is depicted with a perfectly aligned acentric chromophore orientation within a polymer matrix. This orientation is desired, but in box 100 the orientation is perfect and has not been achieved in a real sample.

In box 102, an electro-optic material is shown with randomly disoriented chromophores within an electro-optic polymer matrix. A typical sample may start with chromophores in such a disoriented arrangement.

In box 104, an electro-optic material is shown with an electric field applied. The electric field is strongest near the electrodes outside the surface on either side of the electro-optic material. The electric field is weakest in the center of the electro-optic material. The gradient of the electric field is shown as a denser shading near the surface and less dense near the center. The electric field will serve to orient the chromophores, such as those in box 102.

In box 106, an electro-optic material is shown with the addition of small particles, such as small particle 107. These small particles serve as electrets and thereby form a more homogenous electric field inside the electro-optic polymer. The proposed density of particles need not be proportionate to the illustrative embodiments described above; rather, they are illustrative to demonstrate the distribution of electret species within the system.

In box 108, an electro-optic material is shown with poled chromophores within a normal matrix. The greatest degree of poling is shown near the electrodes. Nevertheless, the orientation of the chromophores is more orderly, closer to the perfect orientation shown in box 100.

In box 110, an electro-optic material is shown with enhanced poling alignment relative to the electro-optic material shown in box 102. In the electro-optic material shown in box 110, the electrics form a more homogenous poling field. As a result, the electro-optic r33 constant is improved.

Thus, the illustrative embodiments present the enhancement of electro-optic performance of organic polymeric electro-optic materials by doping with nanoparticles. In particular, the illustrative embodiments represent the first r33 enhancement by C60 doping in a guest-host polymeric system. The electro-optic materials described are composed of active molecular moieties, or chromophores blended into a host polymer network. Improvements of electro-optic performance, determined by r33 measurements, of up to eighty percent have been observed for an electro-optic material composed of poly(methyl methacrylate) (PMMA), Disperse Red-1 (DR-1) chromophore, and variable percent weight of C60.

Figure 2:
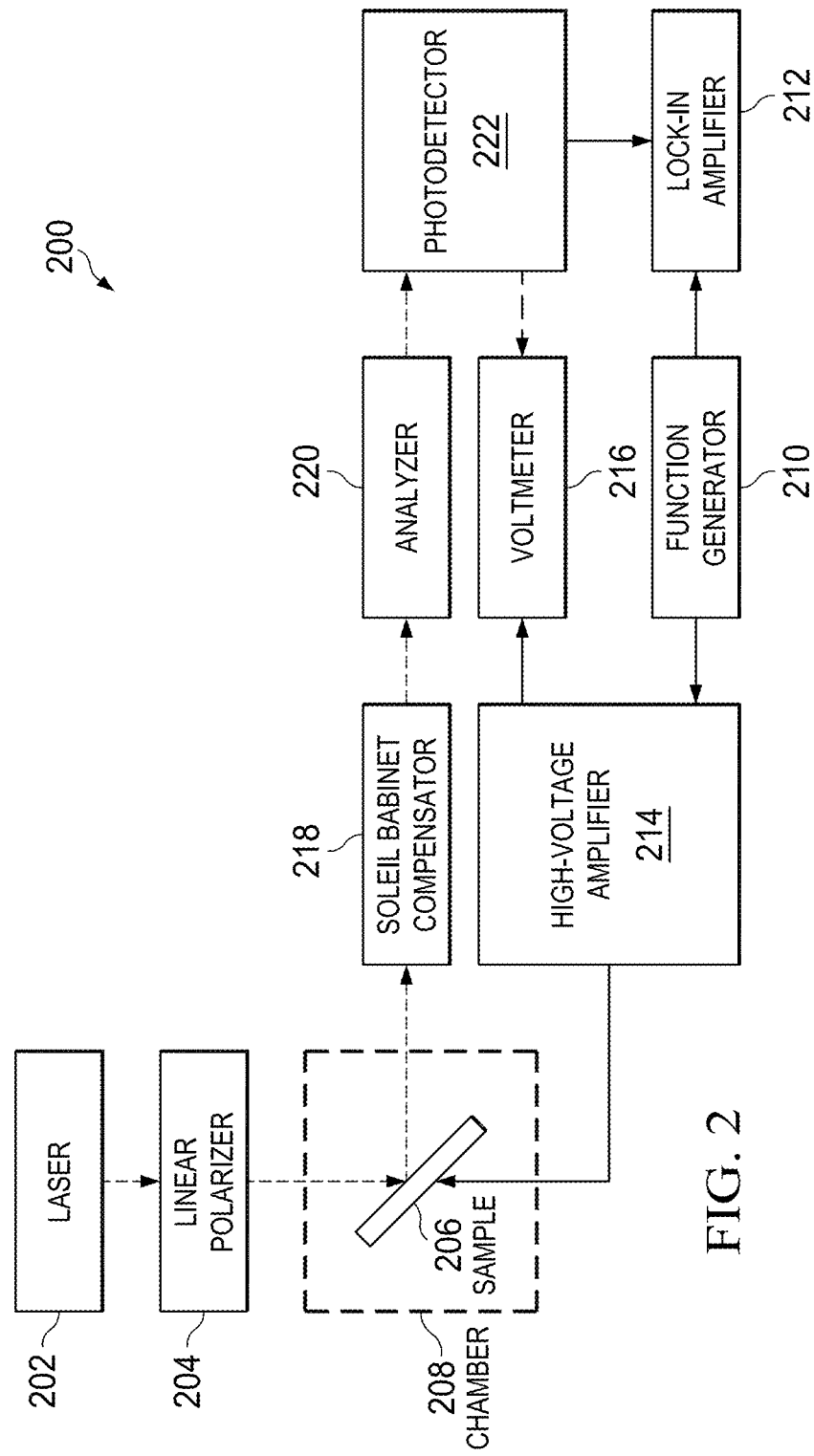
FIG. 2 is a block diagram illustrating a configuration of equipment for poling an electro-optic material, in accordance with an illustrative embodiment.

FIG. 2 is a block diagram illustrating a configuration of equipment for poling an electro-optic material, in accordance with an illustrative embodiment. In particular, FIG. 2 represents an experimental setup for poling and measuring the r33 of an electro-optic material doped with nanoparticles.

The illustrative embodiments described with respect to FIG. 2, and later also with respect to FIG. 3 through FIG. 8, represent a specific example of such an experimental setup. This experimental setup may be varied, and thus the following descriptions do not necessarily limit the claimed inventions.

A summary of sample preparation is addressed first. Formulations of polymer, chromophore, and nanoparticles are well dispersed in a common solvent, composed of a single solvent or solvent mixture, with or without the aid of sonication and/or mixing and/or heating. Solutions are spin-casted onto substrates partially coated with a transparent or semitransparent conducting electrode surface to obtain films from 0.5 micrometers to 2 micrometers in thickness. Samples were then dried to remove solvent, deposited with electrodes, poled, and measured.

A more detailed description of sample preparation is now discussed. Again, this description is a specific example and may be varied, and thus does not necessarily limit the claimed inventions.

Materials:

One material selected was Dispersed Red 1 (DR1) (N-Ethyl-N-(2-hydroxyethyl)-4-(4-nitrophenylazo)aniline), for the chromophore (~95%). Poly (methyl methacrylate) (PMMA, Mw=120 K Da), cyclopentanone, and toluene were also selected. The DR1 chromophore was recrystallized before use. The selected nanoparticles were C60 carbon fullerene nanoparticles (99.5% pure). Metler-Toledo differential scanning calorimeter (DSC) and thermogravimetric analysis (TGA) was used for thermal characterization of the samples.

Sample Preparation:

A PMMA-DR1 control blend was prepared by mixing 10 percent weight of chromophore with polymer. A mixed solvent system with cyclopentanone and toluene in 2:1 ratio was used for blending the materials. Using the same solvent system (cyclopentanone:toluene=2:1), a blend of PMMA-DR1-C60 was made with variable C60 concentrations ranging from 0.05-0.3 percent weight. The PMMA-DR1 ratio was kept constant as a control sample for all the samples with C60.

In the sample preparation step, C60 was first dissolved in toluene. To facilitate the dissolution of C60 in toluene, a pre-weighted amount of C60 was sonicated in a bath sonicator (Branson 2510 by Branson, frequency 40 KHz) for 1.5 hour. Then a measured amount of cyclopentanone, PMMA, and DR1 were added and solubilized by vortexing.

These solutions were spin-casted onto substrates partially coated with a transparent or semitransparent conducting electrode (ITO: indium tin oxide) to obtain films from 0.5 μm to 2 μm in thickness. Before the film casting, the solutions were filtered with 0.45 μmicrometer polytetrafluoroethylene filters. The spinner was ramped to 800 revolutions per minute (rpm) from 0 rpm in 10 seconds and kept at that speed for another 50 seconds for all the samples.

These coated ITO slides were then transferred into a vacuum oven and annealed at eighty degrees Celsius for 12 hours with very slow nitrogen gas purging (0 to 0.5 cubic feet per hour). The film thickness of the samples was measured by a metricon and a profilometer. Gold was deposited by thermal vapor deposition technique in a high-vacuum thermal evaporator on the ITO (indium tin oxide) slides before wiring, polling, and r33 measurements.

Electro-Optic Characterization:

The r33 coefficients of the samples were measured using a custom Teng-Man apparatus shown in FIG. 2. The setup was calibrated with a z-cut lithium niobate sample with an r33=24 pm/V.

FIG. 2 shows the schematic of Teng-Man setup 200 used for electro-optic measurements. Teng-Man setup 200 includes laser 202 which is directed at linear polarizer 204 before being directed to sample 206. Laser 202 may be a 1310 nanometer free space laser in one illustrative embodiment. Sample 206 may be disposed inside chamber 208. Chamber 208 may include an inert gas, such as nitrogen gas or argon gas, but in other sample preparation steps, chamber 208 may contain air or other gasses.

Teng-Man setup 200 also includes an electrical field generation system. This electrical field generation system includes function generator 210 and high-voltage amplifier 214. In a specific example, function generator 210 may generate a 1 KHz sine wave alternating current signal, though the exact signal may be varied. High-voltage amplifier 214 amplifies the signal generated by function generator 210 and then applies the electrical field to sample 206.

Teng-Man setup 200 also includes devices for measuring the electro-optic properties of sample 206. These devices include lock-in amplifier 212, voltmeter 216, Soleil Babinet compensator 218, analyzer 220, and photodetector 222. Operation of these devices is described further below.

A specific example of measuring the electro-optic properties of sample 206 is now discussed. This example may be varied, and thus does not necessarily limit the claimed inventions.

In this example, an unpolarized laser beam from laser 202 first goes through linear polarizer 204 to cause the laser beam to be polarized at 45° relative to the incident plane of sample 206. Then the laser beam is reflected by sample 206 and propagates through Soleil Babinet compensator 218. Soleil Babinet compensator 218 compensates for the phase difference in the polarization of the laser beam reflected by sample 206.

After Soleil Babinet compensator 218, the laser beam passes through analyzer 220. Analyzer 220 may be a second polarizer.

Next, the laser beam goes into photo detector 222 and is measured. In an example, photodetector 222 may be a New Focus, model number 2033 detector.

In turn, photodetector 222 may be connected into voltmeter 216. Voltmeter 216 may be in one example an Agilent multimeter 34401. Photodetector 222 is also connected to lock-in amplifier 212. Voltmeter 216 reads out the direct current intensity of the laser beam.

In addition, an alternating current drive voltage is applied to sample 206 via function generator 210 and high-voltage amplifier 214 when measuring the r33 of sample 206. Lock-in amplifier 212 reads out the modulated signal using the alternating current drive voltage as reference.

Teng-Man setup 200 may be integrated with a heating and poling stage. This stage is also the sample stage. The sample stage may be in chamber 208 which contains the nitrogen atmosphere during the poling process to inhibit additional chemistry during the test.

FIG. 3 is a graph showing a poling profile for a PMMA/DR1 system, in accordance with an illustrative embodiment. Graph 300 is a poling profile of sample 206 of FIG. 2 for a PMMA/DR1 system.

The poling temperature was calibrated for the temperature difference between sample 206 and the thermocouple located inside the heating block. The PMMA/DR1 system glass transition is 93° C. With the doping C60, the glass transition temperature showed as high as 5° C. decrease. The poling field is 90 V/µm.

FIG. 4 is a graph showing a leakage current profile, in accordance with an illustrative embodiment. Graph 400 is a leakage current measured for sample 206 of FIG. 2.

When poling, the leakage current profile for a PMMA/DR1 sample was recorded by an ammeter. The ripple on the trace in region 402 is due to the temperature heating program. The heating source cannot heat smoothly. It will overshoot and wait for the overshoot temperature to slow down.

The electro-optic coefficient, r33, can determined from the following formula:

$$r_{33} = \frac{3}{4\pi} \left(\frac{\lambda}{n^2}\right) \left(\frac{I_m}{I_c V_m}\right) \left(\frac{(n^2 - \sin^2\theta)^{\frac{1}{2}}}{\sin^2\theta}\right)$$

Where, $\lambda$ is optical wavelength, n is refractive index, $I_c$ is the output intensity, $I_m$ is the amplitude of modulation, $V_m$ is the modulating voltage.

Thermal, atomic force microscopy and scanning electron microscopy characterization:

For analyzing with differential scanning calorimetry, 2-5 mg of sample size was used under a flow of nitrogen gas. The measurement method included three heating and cooling cycles to establish a consistent measurement. FIG. 3 shows only the third heating cycle. For each heating cycle, the start temp was thirty degrees Celsius and the end temp two-hundred degrees Celsius at a heating rate of 10.00 K/min. A thermogravimetric analysis was run under the nitrogen gas flow, though alternatively an air flow could be used. In either case, the flow rate may be 50 ml/min. Sample insertion temperature was thirty degrees Celsius that was ramped up to eight-hundred degrees Celsius at a rate of 10 K/min.

Tapping mode atomic force microscopy (TMAFM) investigation of thin film of the samples (coated on ITO slides) was performed using a Nanoscope IV-Multimode Veeco, equipped with an E-type vertical engage scanner. The atomic force microscopy images were acquired at room temperature by using silicon cantilevers with a nominal spring constant of 42 N×m−1 and nominal resonance frequency of 320 kHz (standard silicon OTESPA tips were used). Scanning electron microscopy images were collected on a Zeiss Supra 40 scanning electron microscope.

Figure 5:
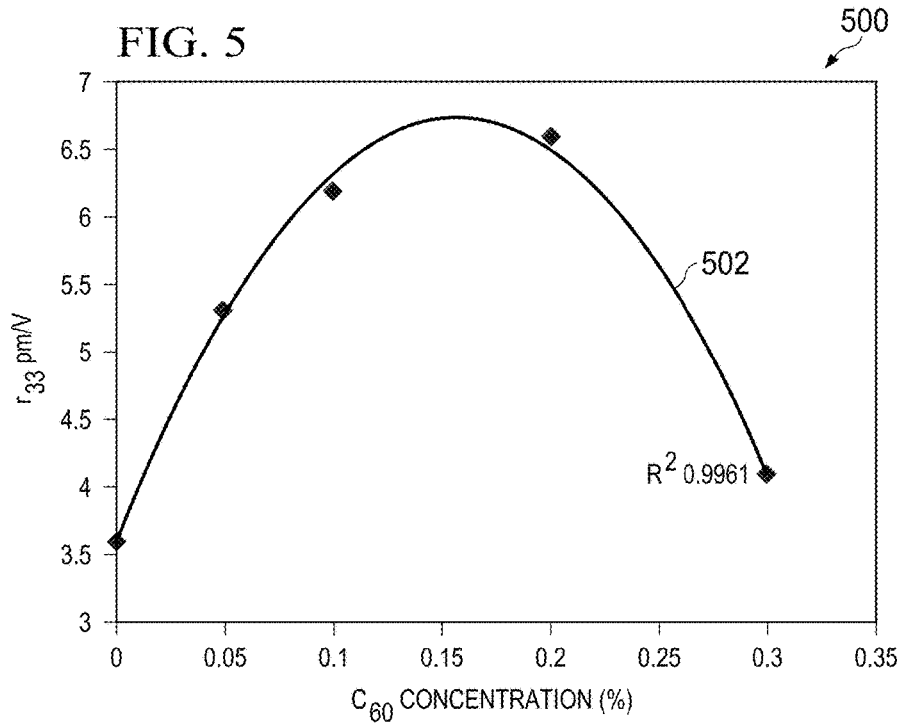
FIG. 5 is a graph showing enhanced r33 electro-optic coefficient values in a PMMA/DR1 sample doped with C60 nanoparticles, in accordance with an illustrative embodiment.
Figure 6:
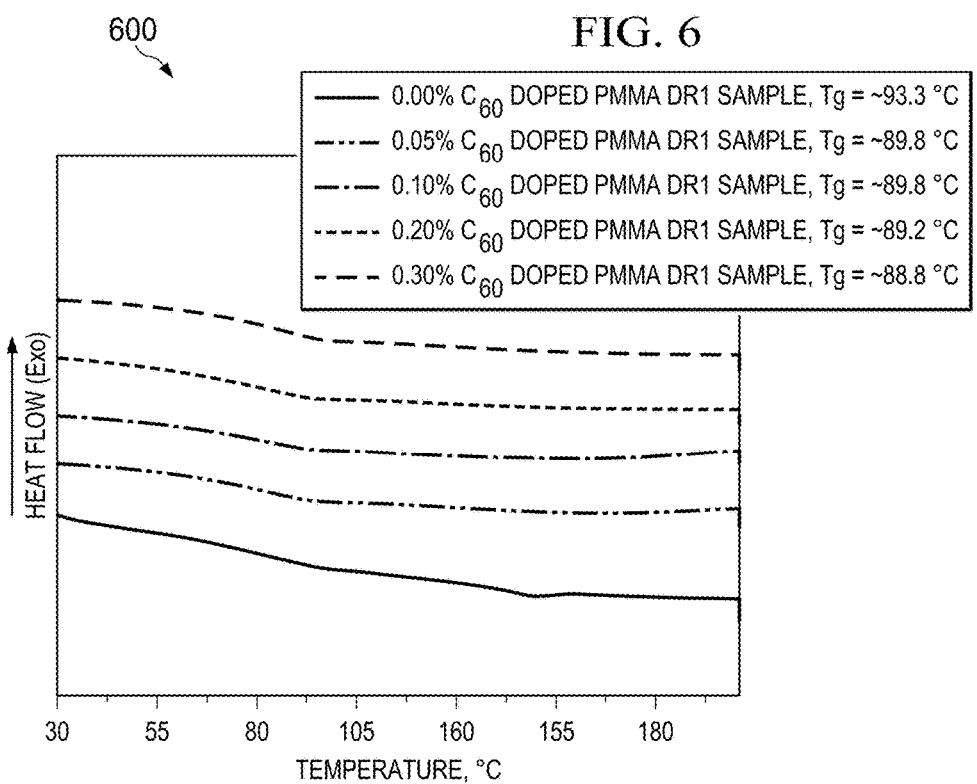
FIG. 6 is a graph showing results of differential scanning calorimetry of undoped PMMA/DR1 samples in comparison to C60 doped PMMA/DR1 samples, in accordance with an illustrative embodiment.
Figure 7:
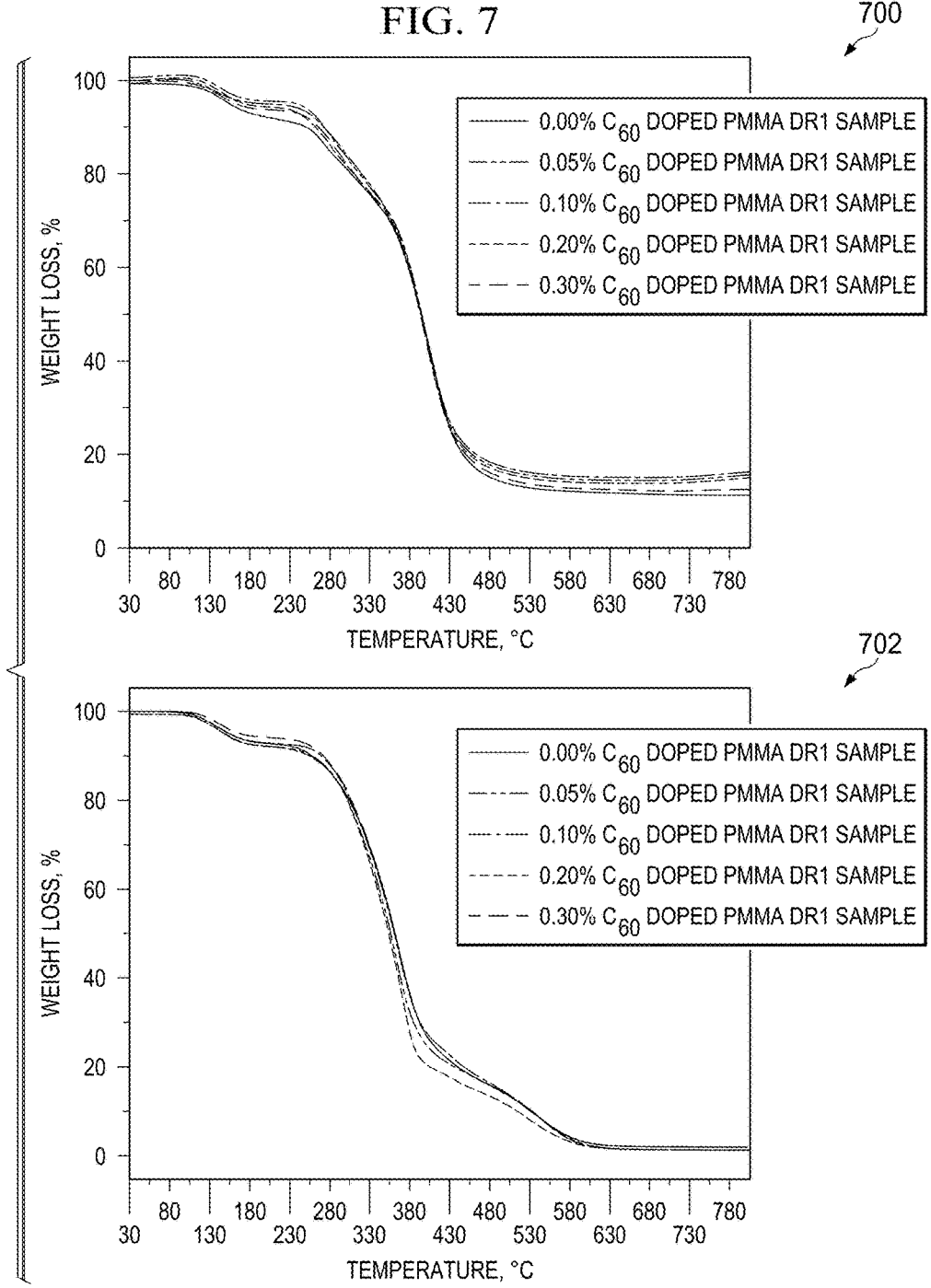
FIG. 7 is two graphs showing thermogravimetric analysis of undoped PMMA/DR1 samples to C60 doped PMMA/DR1 samples in nitrogen gas and in air, in accordance with an illustrative embodiment.
Figure 8A:
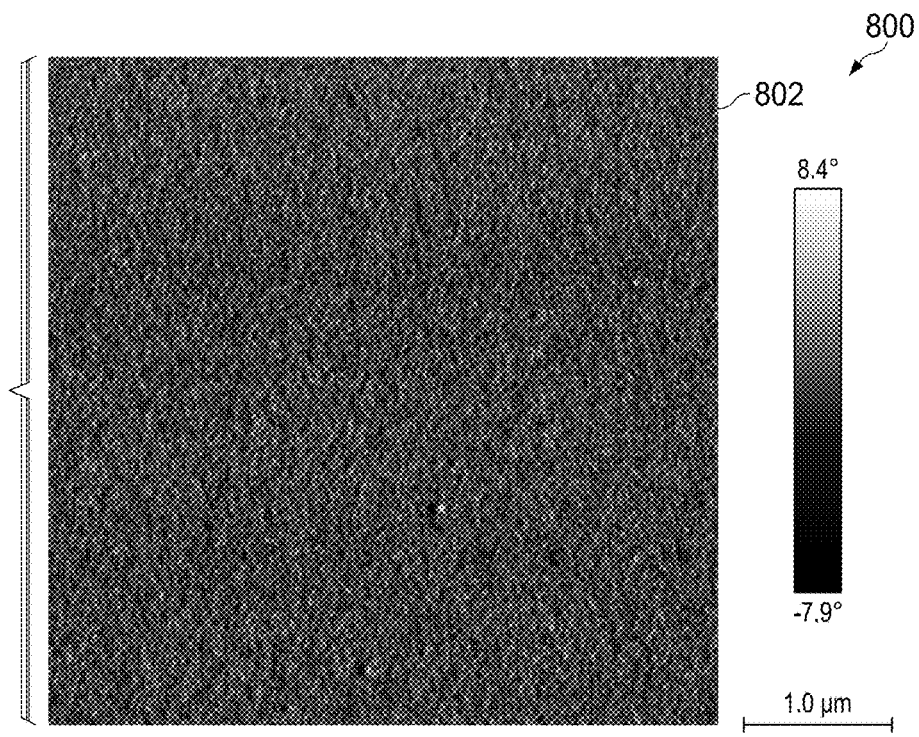
FIGS. 8A through 8F show images of different PMMA/DR1 samples taken using atomic force microscopy, in accordance with an illustrative embodiment.
Figure 8B:
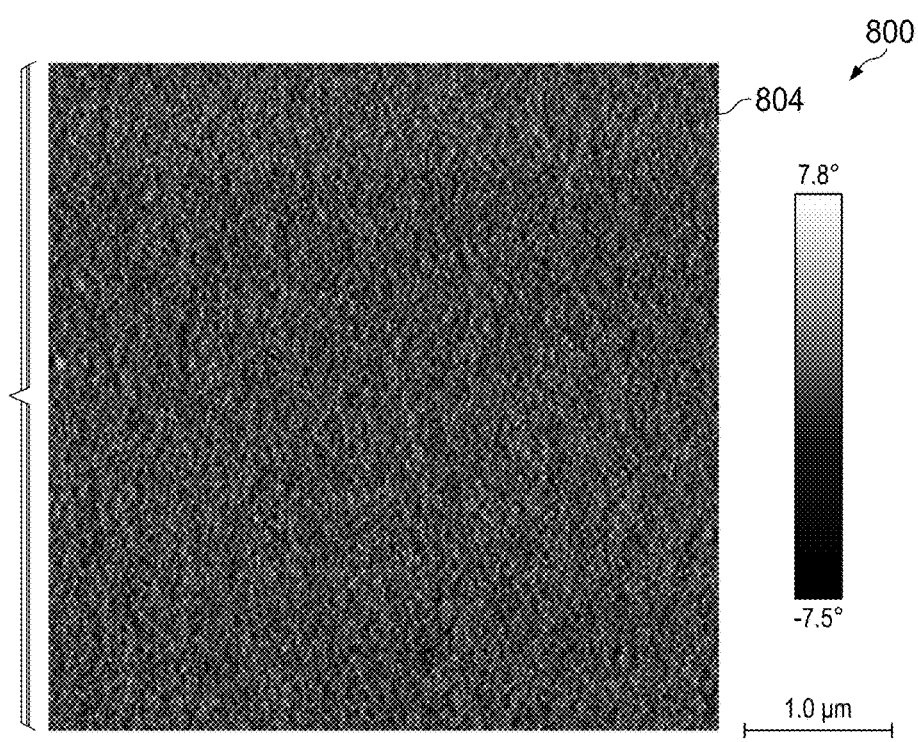
Figure 8C:
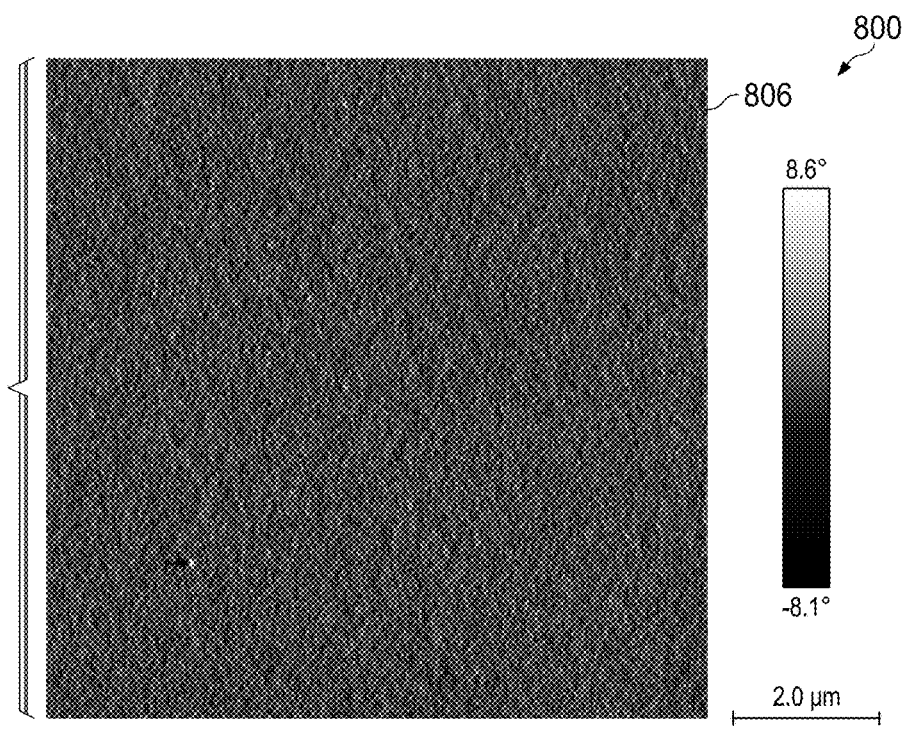
Figure 8D:
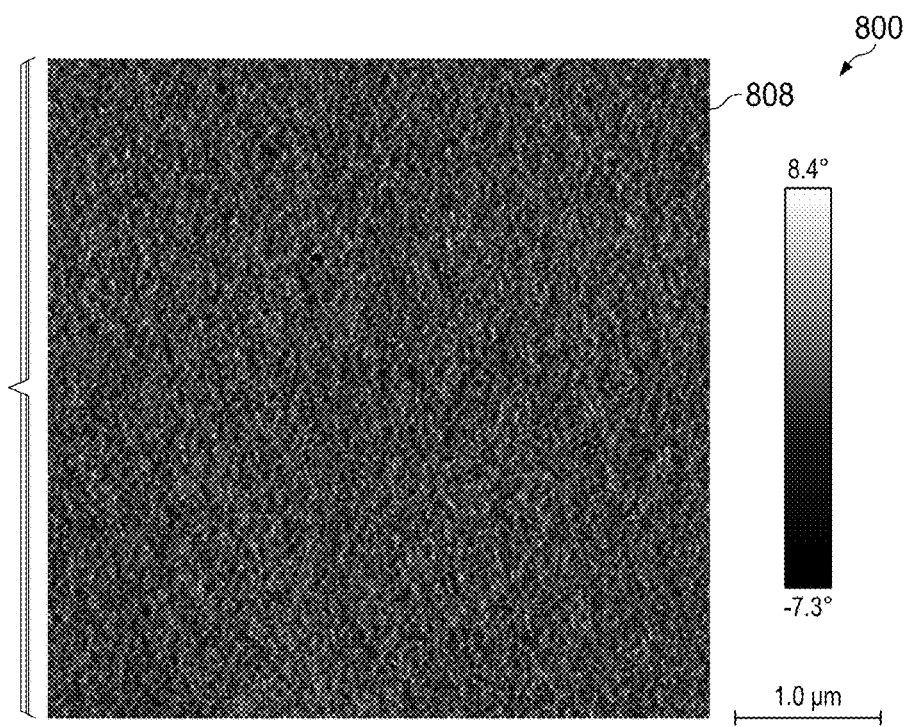
Figure 8E:
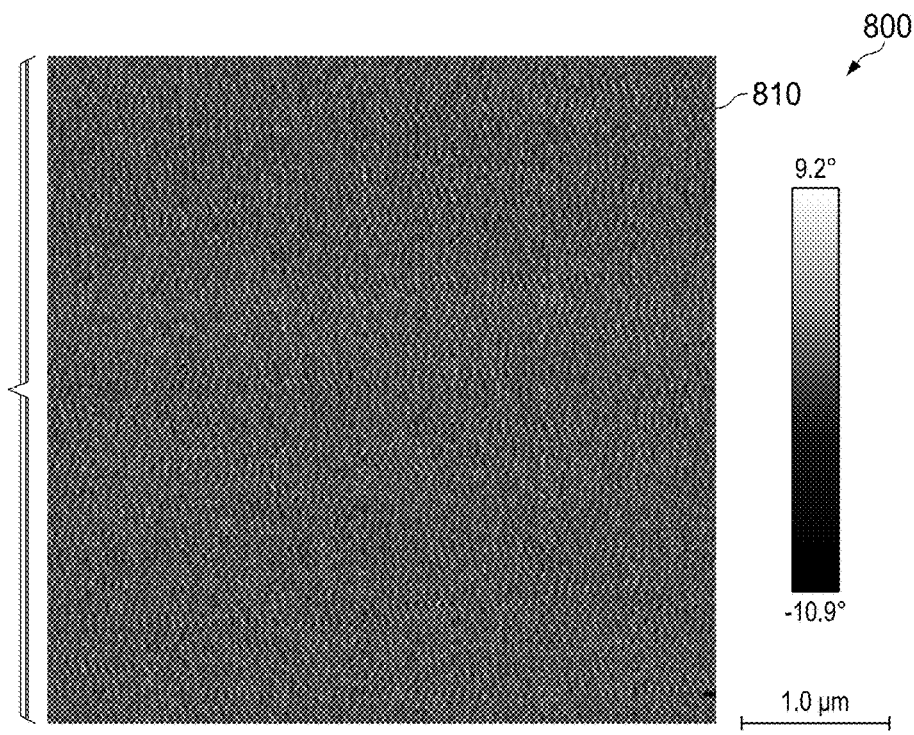
Figure 8F:
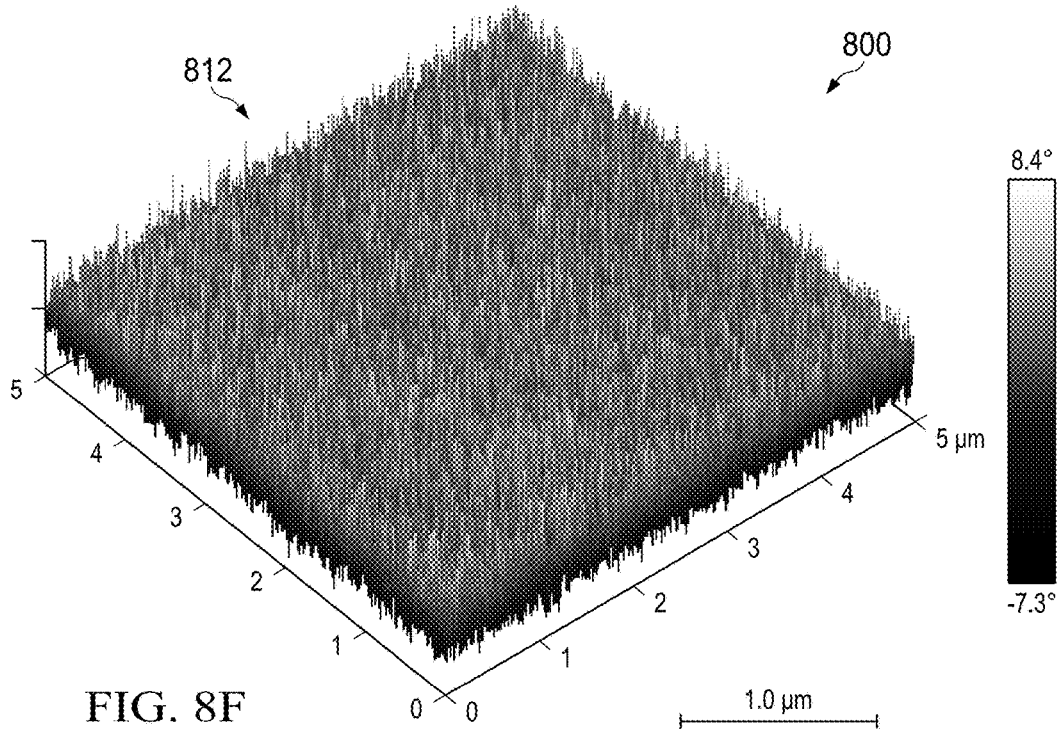

FIG. 5 through FIG. 8 should be read together, as these figures show results of the experimental procedures described above on the sample. The sample may be sample 206 of FIG. 2 prepared as further described and measured according to the descriptions for FIG. 3 and FIG. 4, above. In particular, FIG. 5 is a graph showing enhanced r33 electro-optic coefficient values in a PMMA/DR1 sample doped with C60 nanoparticles, in accordance with an illustrative embodiment. FIG. 6 is a graph showing results of differential scanning calorimetry of undoped PMMA/DR1 samples in comparison to C60 doped PMMA/DR1 samples, in accordance with an illustrative embodiment. FIG. 7 is two graphs showing thermogravimetric analysis of undoped PMMA/DR1 samples to C60 doped PMMA/DR1 samples in nitrogen gas and in air, in accordance with an illustrative embodiment. FIG. 8 shows images of different PMMA/DR1 samples taken using atomic force microscopy, in accordance with an illustrative embodiment.

Results and Discussion:

Thin-film, polymeric electro-optic materials display a non-linear electro-optic response due to the presence of chromophore moieties dispersed within a polymer matrix. These active moieties are initially distributed in a host matrix randomly requiring poling (application of an electric field at high temperature) to make them active (bring them into alignment). Ineffective poling of a chromophore-polymer composite may result in low electro-optic activity (low r33), even if the composing chromophores possess a high $\mu\beta$. Therefore, efficient poling is useful for the formation of efficient electro-optic devices. Techniques or materials which enhance poling will increase the r33 of an electro-optic material, increasing its value by enabling electro-optic modulating devices built thereof to be smaller and require lower voltages for function.

FIG. 5 shows graph 500 of the r33 values of a PMMA/DR1 system. With lower C60 content, r33 values increase as the C60 content in the matrix increases; however, the r33 values drop for higher C60 content beyond the maximum r33 value, shown at about point 502.

A PMMA/DR1 system without any doping showed r33 value of 3.6 pm/V. An eighty percent increase in r33 values were observed for the samples doped with 0.2 percent C60 carbon fullerene nanoparticles.

Graph 600 of FIG. 6 shows the results of a differential scanning calorimetry analysis of the samples. This analysis showed no significant changes in Tg as the C60 content increases, suggesting a minimal plasticization from the C60 dopant. Thermogravimetric analysis of the samples in nitrogen gas and air was done to see if the presence of C60 would catalyze the degradation of the polymer chromophore system.

FIG. 7 is two graphs showing thermogravimetric analysis of undoped PMMA/DR1 samples to C60 doped PMMA/DR1 samples in nitrogen gas and in air, in accordance with an illustrative embodiment.

No appreciable change in degradation profiles of the samples were observed as seen in graph 700 and graph 702 of FIG. 7. Thus, the thermo-chemical properties of the samples tested are all but unaffected by the presence of the C60 doping moieties.

Images of the samples, such as sample 206 of FIG. 2, were taken using atomic force microscopy. These images are shown in images 800 of FIGS. 8A through 8F. Images 800 were examined for surface roughening phenomena that might explain the enhanced effects through local field enhancement. As can be seen, image 800 of the samples does not show any characteristic differences which could be attributed to the higher r33 values of samples containing C60.

Specifically, each image is of a PMMA/DR1 sample. Image 802 has 0.0 percent weight of C60 nanoparticles. Image 804 has 0.5 percent weight of C60 nanoparticles. Image 806 has 0.1 percent weight of C60 nanoparticles. Image 808 has 0.2 percent weight of C60 nanoparticles. Image 810 has 0.3 percent weight of C60 nanoparticles. Image 812 is a three-dimensional image of a PMMA/DR1 sample doped with 0.2 percent weight of C60 carbon fullerene nanoparticles, as also shown in image 808.

The r33 enhancement could be explained by the capacity of C60 to enhance the internal electric field within the sample during poling. Strong macroscopic dipole-development occurred during the poling because of the delocalization of the electrons. As the C60 molecules produce an enhanced electric field, effective localized poling radius also increase. This phenomenon enables better and uniform polarization. The decrease in r33 values at high C60 content can be explained by the emergence of electro-repulsive behavior as the number of C60 molecules become high enough to hinder the internal field enhancement.

CONCLUSION

It has been shown that by adding C60 to a PMMA/DR1 system at a concentration of 0.2 percent weight, the electro-optic coefficient r33 can be enhanced as high as eighty percent of the initial value without C60. Differential scanning calorimeter, thermogravimetric analysis, atomic force microscopy, and scanning electron microscopy images did not show any marked additional differences between the doped and non-doped samples. Thus, the r33 enhancement is due the presence of C60 that can homogenize the applied electric field during poling throughout the samples. As a result, the samples yield a higher electro-optic coefficient.

SUMMARY/OVERVIEW

The illustrative embodiments enhance the electro-optic performance of organic polymeric electro-optic materials by doping with nanoparticles, particularly C60 carbon fullerene nanoparticles. Measurements of polymeric electro-optic materials containing nanoparticles have displayed enhancements of up to 80 percent compared to identical materials not containing nanoparticles. The electro-optic materials described are composed of active molecular moieties, or chromophores, either blended into a host polymer, enchained to a polymer backbone, or crosslinked into a polymeric network.

Enhancing nanoparticles may be organic, inorganic, or organic-inorganic in composition and possess dimensions from 0.5 nm to 100 nm in diameter. Preferably, the nanoparticles are composed of C60. Improvements of electro-optic performance, determined by r33 measurements, of up to 80 percent has been observed for an EC material comprised of poly(methylmethacrylate) (PMMA), Disperse Red-1 (DR1) chromophore, and 0.2 percent weight of C60.

The illustrative embodiments enhance the performance of electro-optic materials by enhancing the poling efficiency of the electro-optic material. Thin-film, polymeric electro-optic materials display a non-linear electro-optic response due to the presence of chromophore moieties dispersed within a polymer matrix. These active moieties are initially distributed in a host matrix randomly requiring poling (application of an electric field at high temperature) to make them active (bring them into alignment). Ineffective poling of a chromophore-polymer composite will result in low electro-optic activity (low r33), even if the composing chromophores possess a high $\mu\beta$. Therefore, efficient poling is useful for the formation of efficient electro-optic devices.

FIG. 9 illustrates a Mach-Zehnder interferometer using C60 doped electro-optic materials, in accordance with an illustrative embodiment. FIG. 9 is an example of a device which may benefit from the enhanced electro-optic coefficient materials described above, particularly but not limited to materials composed of PMMA/DR1 doped with C60.

Instrument 900 is a Mach-Zehnder interferometer. An interferometer is an instrument in which the interference of two beams of light is employed to make precise measurements. A Mach-Zehnder interferometer is a specific type of interferometer. Note that the materials of the illustrative embodiments described above are not limited to usefulness in instrument 900, but may be used any type of optical modulator.

Instrument 900 includes light input 902, two phase shift regions (phase shift region 904 and phase shift region 906), and light output 908. A light beam is directed from light input 902 towards the two phase shift regions. Phase shift region 904 and phase shift region 906 each may affect a change in the phase of light propagating through the corresponding phase shift region. As described further below, an electric field may be used to change the attenuation of the portion of the incoming light passing through either or both of phase shift region 904 and phase shift region 906. As a result, interference may occur, which interference may be analyzed to measure a property of interest.

As mentioned above, the change in phase within a given phase shift region may be accomplished through the application of an applied electric potential across the electro-optic material. This electric potential causes a change in the refractive index of the material, leading to a change in the phase of the propagating light.

Because the illustrative embodiments provide for an enhanced r33 electro-optic coefficient, the effectiveness of the corresponding phase change region is also enhanced, thereby increasing the effectiveness of instrument 900. This same enhancement may be accomplished for any type of electro-optic switch or any other device which uses an electro-optic material.

For example, the switching voltage ($E_\pi$) for a Mach-Zehnder interferometer is proportional to the r33 of the electro-optic active area under bias (phase shift region 904 and phase shift region 906), as well as the length of the active area under electrical bias. For example, a device containing an electro-optic material with an r33 of 30 pm/V will require twice as much driving potential, or twice as long of an active area under bias, as a material with an r33 of 60 pm/V. Both of these parameters, driving potential and device geometry, are important design parameters for the microelectronic industry where voltage and space are to be conserved as much as possible.

Thus, the illustrative embodiments provide for an optical device. The optical device may be an optical modulator composed of an organic polymeric electro-optic material doped with carbon fullerene (C60) nanoparticles, the organic polymeric electro-optic material with C60 nanoparticles having been poled.

The illustrative embodiments further contemplate that, such an optical device, the C60 nanoparticles have a weight of about 0.2 percent. In this case, the organic polymeric electro-optic material comprises poly(methyl methacrylate)/(N-Ethyl-N-(2-hydroxyethyl)-4-(4-nitrophenylazo)aniline)

(PMMA/DR1). As described above, the optical modulator may be a Mach-Zehnder interferometer.

FIG. 10 is a flowchart of a method of poling an organic polymeric electro-optic material, in accordance with an illustrative embodiment. Method 1000 is a variation of the method of poling an electro-optic material, as described above with respect to FIG. 1 through FIG. 8.

Method 1000 may begin by preparing the organic polymeric electro-optic material doped with nanoparticles (operation 1002). This preparing process may involve preparing substrates, adding the dopant to the polymer/chromophore matrix, spin casting the doped solution, drying the doped solution on the substrate, depositing gold, and then poling the material. Method 1000 may also include heating the organic polymeric electro-optic material to a poling temperature (operation 1004). Method 1000 may also include poling the organic polymeric electro-optic material by applying an electric field across the organic polymeric electro-optic material (operation 1006). The process may terminate thereafter.

Method 1000 may be varied. For example, doping may be in a range of about 0.05 percent and 0.3 percent weight of carbon fullerene (C60) nanoparticles. In another example, the organic polymeric electro-optic material comprises poly (methyl methacrylate)/(N-Ethyl-N-(2-hydroxyethyl)-4-(4-nitrophenylazo)aniline) (PMMA/DR1). In yet another example, doping comprises about 0.2 percent weight of carbon fullerene (C60) nanoparticles and wherein the organic polymeric electro-optic material comprises poly (methyl methacrylate)/(N-Ethyl-N-(2-hydroxyethyl)-4-(4-nitrophenylazo)aniline) (PMMA/DR1).

In still another example, the nanoparticles are selected from the group consisting of: Buckminster fullerenes, carbon nanotubes, graphene or its derivatives, and metal organic framework particles. The nanoparticles may have diameters ranging from about 0.5 nanometers (nm) to about 100 nm.

Method 1000 may be expanded to include a doping step. For example, doping may include blending the organic polymeric electro-optic material and the nanoparticles using a mixed solvent system with cyclopentanone and toluene in a 2:1 ratio. In this case, doping may also include sonicating carbon fullerene (C60) nanoparticles; dissolving in the C60 nanoparticles in toluene to form a mixture; adding cyclopentanone, poly(methyl methacrylate), and (N-Ethyl-N-(2-hydroxyethyl)-4-(4-nitrophenylazo)aniline) to the mixture to form a second mixture; spin casting the second mixture onto a substrate, the substrate at least partially coated with a transparent or semitransparent conducting electrode film, wherein spin casting forms a slide; annealing the slide at about eighty degrees Celsius for twelve hours with a nitrogen gas purging rate less than about 0.5 cubic feet per hour; and thereafter depositing gold by thermal vapor deposition onto the slide.

In a different example, the electric field comprises about ninety volts per micrometer. In yet another example, doping the organic polymeric electro-optic material with nanoparticles forms a doped material. In this case, the poling temperature is achieved by placing the doped material on a hot plate at about thirty degrees Celsius and then ramping up the temperature to the poling temperature. The poling temperature may be about eighty degrees Celsius. However, if the Tg of the material varies, then the poling temperature may also be varied. Thus, for example, if the Tg of the material is ninety degrees Celsius then poling should occur at this temperature. Ramping up the temperature may be performed at a rate of about ten degrees Celsius per minute.

In a specific example, doping may be about 0.2 percent weight of carbon fullerene (C60) nanoparticles in a diameter range of about 0.5 nm to about 100 nm to form a doped material. The organic polymeric electro-optic material comprises poly(methyl methacrylate)/(N-Ethyl-N-(2-hydroxyethyl)-4-(4-nitrophenylazo)aniline) (PMMA/DR1). In this case, doping may be blending the organic polymeric electro-optic material and the nanoparticles using a mixed solvent system with cyclopentanone and toluene in a 2:1 ratio. For this example, the electric field may be about ninety volts per micrometer and the poling temperature may be achieved by heating the doped material to about thirty degrees Celsius and then ramping up to the poling temperature of about eighty degrees Celsius at a rate of about ten degrees Celsius per minute. Heating may take place by placing the sample onto a heating plate, though other heating mechanisms could be used such as but not limited to an oven.

Continuing this example, doping may also include sonicating carbon fullerene (C60) nanoparticles; dissolving in the C60 nanoparticles in toluene to form a mixture; adding cyclopentanone, poly(methyl methacrylate), and (N-Ethyl-N-(2-hydroxyethyl)-4-(4-nitrophenylazo)aniline) to the mixture to form a second mixture; spin casting the second mixture onto a substrate, the substrate at least partially coated with a transparent or semitransparent conducting electrode film, wherein spin casting forms a slide; annealing the slide at about eighty degrees Celsius for twelve hours with a nitrogen gas purging rate less than about 0.5 cubic feet per hour; and thereafter depositing gold by thermal vapor deposition onto the slide.

Other examples are also possible. Thus, method 1000 does not necessarily limit the claimed inventions.

FIG. 11 is a block diagram of a material having improved electro-optic coefficient (r33) values, in accordance with an illustrative embodiment. Material 1100 may be an organic polymeric electro-optic material doped with carbon fullerene (C60) nanoparticles 1102.

This material may be varied. For example, the C60 nanoparticles may constitute a weight in a range of about 0.05 percent and 0.3 percent. In another example, the organic polymeric electro-optic material may be poly(methyl methacrylate)/(N-Ethyl-N-(2-hydroxyethyl)-4-(4-nitrophenylazo)aniline) (PMMA/DR1). In yet another example, the C60 nanoparticles comprise a weight of about 0.2 percent and the organic polymeric electro-optic material may be poly(methyl methacrylate)/(N-Ethyl-N-(2-hydroxyethyl)-4-(4-nitrophenylazo)aniline) (PMMA/DR1).

Other examples are also possible. Thus, material 1100 does not necessarily limit the claimed inventions.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:
1. A method of poling an organic polymeric electro-optic material, the method comprising:
doping the organic polymeric electro-optic material with nanoparticles, wherein doping further comprises;

blending the organic polymeric electro-optic material and the nanoparticles using a mixed solvent system with cyclopentanone and toluene in a 2:1 ratio;

sonicating carbon fullerene (C60) nanoparticles;

dissolving in the carbon fullerene nanoparticles in toluene to form a mixture;

adding cyclopentanone, poly(methyl methacrylate), and (N-Ethyl-N-(2-hydroxyethyl)-4-(4-nitrophenylazo)aniline) to the mixture to form a second mixture;

spin casting the second mixture onto a substrate, the substrate at least partially coated with a transparent or semitransparent conducting electrode film, wherein spin casting forms a slide;

annealing the slide at about eighty degrees Celsius for twelve hours with a nitrogen gas purging rate less than about 0.5 cubic feet per hour; and thereafter depositing gold by thermal vapor deposition onto the slide;

heating the organic polymeric electro-optic material to a poling temperature; and poling the organic polymeric electro-optic material by applying an electric field across the organic polymeric electro-optic material.

2. The method of claim 1, wherein doping comprises a range of about 0.05 percent and 0.3 percent weight of carbon fullerene (C60) nanoparticles.

3. The method of claim 1, wherein the organic polymeric electro-optic material comprises poly(methyl methacrylate)/(N-Ethyl-N-(2-hydroxyethyl)-4-(4-nitrophenylazo)aniline) (PMMA/DR1).

4. The method of claim 1, wherein doping comprises about 0.2 percent weight of carbon fullerene (C60) nanoparticles and wherein the organic polymeric electro-optic material comprises poly(methyl methacrylate)/(N-Ethyl-N-(2-hydroxyethyl)-4-(4-nitrophenylazo)aniline) (PMMA/DR1).

5. The method of claim 1, wherein the nanoparticles are selected from the group consisting of: Buckminster fullerenes, carbon nanotubes, graphene or its derivatives, and metal organic framework particles.

6. The method of claim 1, wherein the nanoparticles have diameters ranging from about 0.5 nm to about 100 nm.

7. The method of claim 1, wherein the electric field comprises about ninety volts per micrometer.

8. A method of poling an organic polymeric electro-optic material, the method comprising:

doping the organic polymeric electro-optic material with nanoparticles wherein doping the organic polymeric electro-optic material with nanoparticles forms a doped material, and wherein the poling temperature is achieved by placing the doped material on a hot plate at about thirty degrees Celsius and then ramping up the temperature to the poling temperature;

heating the organic polymeric electro-optic material to a poling temperature; and poling the organic polymeric electro-optic material by applying an electric field across the organic polymeric electro-optic material; and wherein:

doping comprises about 0.2 percent weight of carbon fullerene (C60) nanoparticles in a diameter range of about 0.5 nm to about 100 nm to form a doped material;

the organic polymeric electro-optic material comprises poly(methyl methacrylate)/(N-Ethyl-N-(2-hydroxyethyl)-4-(4-nitrophenylazo)aniline) (PMMA/DR1);

doping comprises blending the organic polymeric electro-optic material and the nanoparticles using a mixed solvent system with cyclopentanone and toluene in a 2:1 ratio;

the electric field comprises about ninety volts per micrometer; and the poling temperature is achieved by heating the doped material to about thirty degrees Celsius and then ramping up to the poling temperature of about eighty degrees Celsius at a rate of about ten degrees Celsius per minute.

9. The method of claim 8, wherein the poling temperature comprises about eighty degrees Celsius.

10. The method of claim 8, wherein ramping up the temperature is performed at a rate of about ten degrees Celsius per minute.

11. The method of claim 8, wherein doping further comprises:

sonicating carbon fullerene (C60) nanoparticles;

dissolving in the C60 nanoparticles in toluene to form a mixture;

adding cyclopentanone, poly(methyl methacrylate), and (N-Ethyl-N-(2-hydroxyethyl)-4-(4-nitrophenylazo)aniline) to the mixture to form a second mixture;

spin casting the second mixture onto a substrate, the substrate at least partially coated with a transparent or semitransparent conducting electrode film, wherein spin casting forms a slide;

annealing the slide at about eighty degrees Celsius for twelve hours with a nitrogen gas purging rate less than about 0.5 cubic feet per hour; and thereafter depositing gold by thermal vapor deposition onto the slide.

* * * * *